United States Patent
Gaunt et al.

(10) Patent No.: US 9,946,449 B2
(45) Date of Patent: Apr. 17, 2018

(54) DISPLAY MODE BASED MEDIA PLAYER SWITCHING

(71) Applicant: Google Inc., Mountain View, CA (US)

(72) Inventors: Robert Christopher Gaunt, Pacifica, CA (US); Richard Benjamin Leider, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 60 days.

(21) Appl. No.: 15/261,436

(22) Filed: Sep. 9, 2016

(65) Prior Publication Data

US 2016/0378324 A1  Dec. 29, 2016

Related U.S. Application Data

(63) Continuation of application No. 14/301,892, filed on Jun. 11, 2014, now Pat. No. 9,442,640.

(51) Int. Cl.
  *G06F 3/048* (2013.01)
  *G06F 3/0484* (2013.01)
  (Continued)

(52) U.S. Cl.
  CPC ........ *G06F 3/04847* (2013.01); *G06F 3/0481* (2013.01); *G06F 3/0484* (2013.01);
  (Continued)

(58) Field of Classification Search
  CPC .. G06F 3/04847; G06F 3/0481; G06F 3/0484; G06F 3/165; H04L 67/1095; H04N 5/44591
  (Continued)

(56) References Cited

U.S. PATENT DOCUMENTS 7,178,106 B2  2/2007  Lamkin et al.
8,073,858 B2  12/2011  Surasinghe
(Continued)

FOREIGN PATENT DOCUMENTS

EP  1551182 A1  7/2005

OTHER PUBLICATIONS

PCT International Search Report and Written Opinion for PCT/US2015/028747, dated Jul. 13, 2015, 7 Pages.

*Primary Examiner* — David Phantana-angkool
(74) *Attorney, Agent, or Firm* — Young Basile Hanlon & MacFarlane, P.C.

(57) ABSTRACT

A media item is presented via a media player, the media player configured to receive the media item, the media item being associated with a format and including an audio component. Responsive to a change in a display mode associated with the media player, a second media player is identified that is configured to receive a corresponding media item, the corresponding media item being associated with a second format and including a second audio component that matches the audio component. A particular location is determined in the media item to cease presentation of the media item via the media player and a corresponding location in the corresponding media item to begin presentation of the corresponding media item using the second media player. Responsive to reaching the particular location, concurrently, presentation of the media item is ceased and presentation of the corresponding media item at the corresponding location is begun.

20 Claims, 4 Drawing Sheets

(51) Int. Cl.
*H04L 29/08* (2006.01)
*G06F 3/0481* (2013.01)
*G06F 3/16* (2006.01)
*H04N 5/268* (2006.01)
*H04N 5/445* (2011.01)

(52) U.S. Cl.
CPC .......... *G06F 3/04845* (2013.01); *G06F 3/165* (2013.01); *H04L 67/1095* (2013.01); *H04N 5/268* (2013.01); *H04N 5/44591* (2013.01)

(58) Field of Classification Search
USPC ........................................................ 715/716
See application file for complete search history.

(56) References Cited

U.S. PATENT DOCUMENTS

| | | | |
|---|---|---|---|
| 8,402,187 B2* | 3/2013 | Lydon | G11L 319/027 |
| | | | 710/105 |
| 8,878,773 B1 | 11/2014 | Bozarth | |
| 9,324,094 B1 | 4/2016 | Chalawsky | |
| 9,356,983 B2 | 5/2016 | Basso et al. | |
| 9,442,640 B2* | 9/2016 | Gaunt | G06F 3/0484 |
| 2002/0156938 A1 | 10/2002 | Wong et al. | |
| 2006/0287912 A1* | 12/2006 | Raghuvamshi | G06Q 30/02 |
| | | | 705/14.4 |
| 2008/0002709 A1 | 1/2008 | Kennedy et al. | |
| 2008/0008458 A1 | 1/2008 | Gudipaty et al. | |
| 2008/0152300 A1* | 6/2008 | Knee | G11B 27/005 |
| | | | 386/250 |
| 2009/0254931 A1* | 10/2009 | Pizzurro | G06Q 30/02 |
| | | | 725/5 |
| 2010/0146078 A1 | 6/2010 | Wolff et al. | |
| 2011/0202828 A1 | 8/2011 | Wan | |
| 2012/0102236 A1 | 4/2012 | Schubert et al. | |
| 2015/0007709 A1 | 1/2015 | Ghosh et al. | |
| 2015/0019783 A1 | 1/2015 | Kalayjian et al. | |
| 2015/0086178 A1 | 3/2015 | Ray et al. | |
| 2015/0363060 A1* | 12/2015 | Gaunt | G06F 3/0484 |
| | | | 715/716 |

* cited by examiner

DISPLAY MODE BASED MEDIA PLAYER SWITCHING

CROSS REFERENCE TO RELATED APPLICATIONS

This application is a continuation of co-pending U.S. application Ser. No. 14/301,892, filed Jun. 11, 2014, which is herein incorporated in its entirety by reference.

BACKGROUND

Field

This disclosure relates to the field of presenting a media item via a graphical user interface, and specifically to conserving bandwidth by switching media players based on changes to display modes associated with the media players.

Description of the Related Art

Many owners of digital devices use them to stream video files. A user may move a media player into the background such that a picture component of a video file is not displayed to the user while it is streaming the video file. In such cases, the media player continues to stream video—even though only the audio component of the video file is actually being presented to the user. This is not an efficient use of bandwidth as the picture component of the video file constitutes a much larger share than the audio component of the video file, and the media player in the background is not presenting the picture component of the streaming video to the user. Moreover, in some cases, the media player in the background continues to stream video without regard for the display size of the video. That is, even if a user resizes the media player to smaller resolution (e.g., 144 p) before placing the media player in the background, the media player will still stream at a higher resolution (e.g., 1080 p) if the device and connection supports it. In general streaming video from a media player in the background wastes bandwidth, resources of the digital device (uses more memory and power than audio only), and resources of the media provider streaming the video file to the digital device.

SUMMARY

The disclosed embodiments include a computer-implemented method, a non-transitory computer-readable storage medium storing executable code, and a system for switching between media players on a user device.

One embodiment of the computer-implemented method for switching between media players on a user device, comprises presenting a media item to a user of the user device via a first media player, the first media player configured to receive the media item in a first data stream, the media item being associated with a first format and including a first audio component. Responsive to a change in a display mode associated with the first media player, a second media player is identified that is configured to receive a corresponding media item in a second data stream, the corresponding media item being associated with a second format and including a second audio component that matches the first audio component. Additionally, a particular location is determined in the media item to cease presentation of the media item via the first media player and a corresponding location in the corresponding media item to begin presentation of the corresponding media item using the second media player. Responsive to reaching the particular location in the media item, concurrently, presentation of the media item via the first media player is ceased and presentation of the corresponding media item at the corresponding location using the second media player is begun.

One embodiment of a non-transitory computer-readable storage medium storing executable computer program instructions for switching between media players on a user device, comprises presenting a media item to a user of the user device via a first media player, the first media player configured to receive the media item in a first data stream, the media item being associated with a first format and including a first audio component. Responsive to a change in a display mode associated with the first media player, a second media player is identified that is configured to receive a corresponding media item in a second data stream, the corresponding media item being associated with a second format and including a second audio component that matches the first audio component. Additionally, a particular location is determined in the media item to cease presentation of the media item via the first media player and a corresponding location in the corresponding media item to begin presentation of the corresponding media item using the second media player. Responsive to reaching the particular location in the media item, concurrently, presentation of the media item via the first media player is ceased and presentation of the corresponding media item at the corresponding location using the second media player is begun.

One embodiment of a device for switching between media players on a user device, comprises a processor configured to execute modules, and a memory storing the modules. The modules include a user interface module configured to present a media item to a user of the user device via a first media player, the first media player configured to receive the media item in a first data stream, the media item being associated with a first format and including a first audio component. The modules also include a display mode module configured to detect a change in a display mode associated with the first media player. The modules also include a player identification module configured to identify a second media player that is configured to receive a corresponding media item in a second data stream, the corresponding media item being associated with a second format and including a second audio component that matches the first audio component. The modules also include a synchronization module configured to determine a particular location in the media item to cease presentation of the media item via the first media player and a corresponding location in the corresponding media item to begin presentation of the corresponding media item using the second media player. Additionally, the user interface module is further configured to, responsive to reaching the particular location in the media item, concurrently, cease presentation of the media item via the first media player and begin presentation of the corresponding media item at the corresponding location using the second media player.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
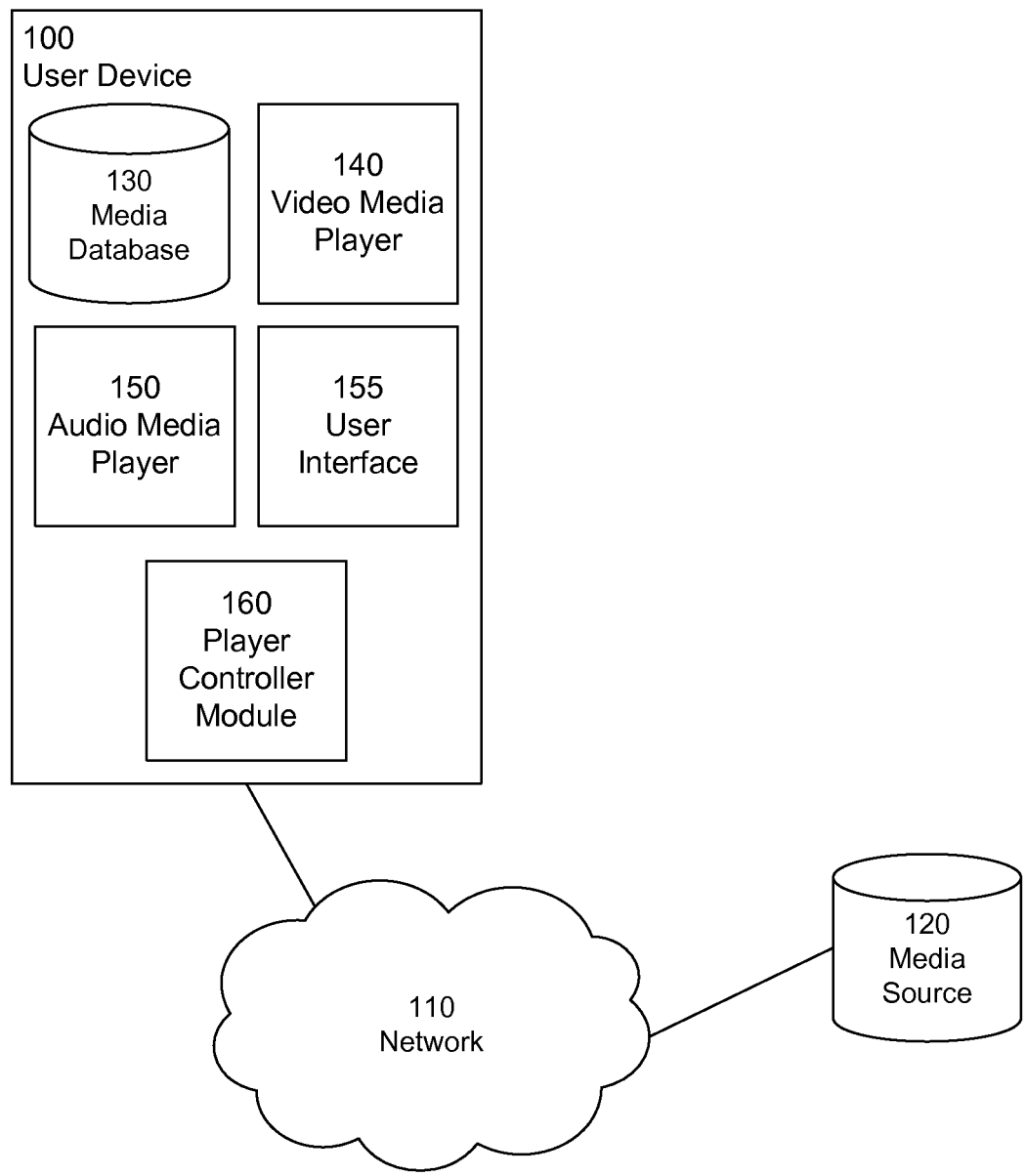
FIG. 1 is a block diagram illustrating an embodiment of an environment for media player switching based on detected changes to a display mode associated with an active media player.

FIG. 1 is a block diagram illustrating an embodiment of an environment for media player switching based on detected changes to a display mode associated with an active media player. The environment includes a user device 100 connected by a network 110 to a media source 120. Here only one user device 100 and media source 120 are illustrated but there may be multiple instances of each of these entities. For example, there may be thousands or millions of user devices 100 in communication with multiple media sources 120.

The network 110 provides a communication infrastructure between the user devices 100 and the media sources 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The media source 120 includes one or more computer servers that provide media items to the user devices 100. In some embodiments, the media source 120 may be a video streaming website (e.g., YouTube®). Media items may be of different formats (e.g., video media items or audio media items). A video media item includes a picture component and an audio component. A video media item may be, e.g., a video file and/or a portion thereof. An audio media item includes an audio component, but does not include a picture component. An audio media item may be, e.g., an audio file and/or a portion thereof. A video media item and an audio media item that have the same audio component are referred to as corresponding media items. For example, a video media item of a movie "X" may have a corresponding media item in the form of an audio media item for the movie "X." The audio component of corresponding media items is the same, such that the audio component of a video media item at time n is the same as the audio component of the corresponding audio media item at time n. The media source 120 may include mappings of various media items to media identifiers associated with corresponding media items.

The media source 120 maintains information relating to media items. Information relating to a media item may include, for example, a media item address, a media item identifier, a media item identifier for a corresponding media item, metadata associated with the content, or some combination thereof. The media item address is an address where the media item may be downloaded from, streamed from, or some combination thereof. The media item identifier is an identifier that uniquely identifies the media item. The metadata describes different aspects of the content. The metadata may comprise, for example, author, date of publishing, reviews, genre information, publisher, ratings, a media item identifier, some other information relating to a media item, or some combination thereof. Additionally, in embodiments, where the media source 120 is streaming a media item, the media item may be associated with streaming metadata. Streaming metadata describes different characteristics associated with streaming the media item. Streaming metadata may include, e.g., an estimated minimum bandwidth required to stream the media item, an estimated minimum bandwidth required to stream a corresponding media item, the HTTP Live Streaming (HLS) playlist, or some combination thereof.

Responsive to requests received from the user device 100, the media source 120 provides a requested media item and some or all of the information relating to the requested media item to the user device 100. In some embodiments, the media source 120 streams the requested media item to the user device 100. For example, the media source 120 may stream a video media item and/or a corresponding audio media item to the user device 100. The media source 120 may directly provide content to the user clients 100 via the network 110.

The user devices 100 are computing devices that execute computer program modules—e.g., a web browser, e-book reader, media player, or other client application—which allow a user to consume audio and/or video data. A user device 100 might be, for example, a personal computer, a tablet computer, a smart phone, a laptop computer, a dedicated e-reader, or other type of network-capable device such as a networked television or set-top box.

A user device 100 comprises a media database 130, a user interface 155, a video media player 140, an audio media player 150, and a player controller module 160 in one embodiment. In one embodiment these entities are software application modules executing on the user device 100. For example, the modules 130, 140, 150, and 160 may be integrated into a smart phone application executing on a smart phone.

The media database 130 stores media items and any information relating to media items. In some embodiments, the media database 130 may store corresponding media items that may be presented to the user via the video media player 140 and/or the audio media player 150.

The video media player 140 presents video media items requested by a user operating user device 100 via an interface on the user interface 155. The video media player 140 retrieves (and/or streams) a requested video media item from the media source 120 and/or other sources such as, video retailers, libraries, or from the media database 130, using, e.g., a media identifier or media item metadata. The video media player 140 presents the retrieved video media item to the user. In some embodiments, the video media player 140 presents the retrieved video media item as it is being streamed over the network 110 from, for example, the media source 120 or some other source. Additionally, responsive to instructions (i.e., switch commands described below with respect to FIG. 3) received from the player controller module 160, the video media player 140 may mute a video media item being presented by the video media player 140, stop playback of a video media item being presented by the video media player 140, begin playback of a video media item or a portion of the video media item at a synchronization point received from the player controller module 160, load the video media player 140, close the video media player 140, retrieve (and/or stream) a video media item and/or a portion of a video media item, or some combination thereof.

The audio media player 150 is a media player that presents audio media items requested by a user operating user device 100 via an interface on the user interface 155.

The audio media player 150 retrieves (and/or streams) a requested audio media item from the media source 120 and/or other sources such as, audio retailers, libraries, or from the media database 130, using, e.g., a media identifier or media item metadata. The audio media player 150 presents the retrieved audio media item to the user. In some embodiments, the audio media player 150 presents the retrieved audio media item as it is being streamed over the network 110 from, for example, the media source 120 or some other source. Additionally, responsive to instructions (e.g., switch commands described below with respect to FIG. 3) from the player controller module 160, the audio media player 150 may mute an audio media item being presented by the user device 100, stop playback of an audio media item being presented by the audio media player 150, begin playback of an audio media item or a portion of the audio media item 140 at a synchronization point received from the player controller module 160, load the audio media player 150, close the audio media player 150, retrieve (and/or stream) an audio media item and/or a portion of an audio media item, or some combination thereof. In alternate embodiments, the audio media player 150 may be replaced with an audio/video media player that has one or more characteristics of the video media player 140. For example, the audio/video media player may be able to present video media items via the user device 100.

The user interface 155 enables a user to interact with one or more applications on the user device 100, other applications and/or entities over the network 110, or some combination thereof. The user interface 155 presents one or more graphical and/or textual interfaces to the user by which the user interacts with, e.g., the video media player 140 and/or the audio media player 150. For example, the user may use the user interface 155 to access the video media player 140 to request a video media item from the media source 120 and/or the media database 130.

The user interface 155 enables a user to adjust how the one or more interfaces are being displayed to the user. For example, the user interface module 155 may allow a user to maximize, minimize, re-size, position, or some combination thereof, an interface for an application (e.g., the media video player 140). Additionally, the user interface module 155 may allow a user to overlay the interface with one or more interfaces for other applications. For example, the user interface 155 may overlay an interface for the video media player 140 that is displaying a video media item with another interface (or some other graphic) such that some or all of the picture component of the video media item is not visible to the user. Additionally, in some embodiments, the user interface 155 may enable a user to 'lock' the user device 100. A 'locked' user device 100 may present an audio component of a media item, but prevents presentation of a picture component of a video media item.

In some embodiments, the user interface 155 generates display information using the interfaces associated with the video media player 140 and the audio media player 150. Display information describes how the interfaces of the media players are being presented to the user. Display information may include, e.g., information identifying a media player presenting a media item, information describing whether an interface is minimized, information describing whether an interface is overlaid with some other graphic, information describing a portion of a picture component of a media video item being displayed that is not visible to the user, information describing whether the user device 100 is 'locked,' or some combination thereof. The user interface 155 provides the display information to the player controller module 160. In some embodiments, the user interface 155 provides the display information to the player controller module 160 whenever there is a change to the display information.

The player controller module 160 is configured to detect a change in a display mode associated with an active media player using the display information. An active media player is a media player presenting a media item. For example, an active media player may be the video media player 140 presenting a video media item in a user interface of user device 100, or an audio media player 150 presenting an audio media item via, e.g., a speaker or headphone jack of the client device 100. A display mode, described in detail below with respect to FIG. 3, describes whether a media player is in the foreground (e.g., foreground mode) or the background (e.g., background mode) of the user interface 135. A video media item is in a background mode if the picture component of the media item being presented by the video media player 140 is not displayed to the user. In contrast, if some portion of the picture component is being displayed such that it is visible to the user, the video media player 150 is in the foreground mode.

The player controller module 160 determines a display mode associated with a media player using the display information. The player controller module 160 detects a change in the display mode of the media player by comparing the determined display mode with a display mode that was last associated with the media player. If the display modes are the same, no change has occurred, in contrast, if the display modes are different, a change in the display mode has occurred. For example, the player controller module 160 may determine that the video media player 140 is in the foreground using display information. And at some later time, the player controller module 140 may receive updated display information, and may determine from the updated display information that the entire picture component of the video media item being presented is not being presented to the user. Based on this change, the player controller module 160 determines that the video media player 140 has been placed into a background mode. The player controller module 160 may request the display information from the user interface 155.

The player controller module 160 determines whether presentation of a media item by an active media player should be transitioned to presentation of a corresponding media item by a different media player based in part on changes in the display mode associated with active media player. In various embodiments, where the active media player is the video media player 140, and the video media player 140 is being placed into a background mode, the player controller module 160 determines that presentation of the video media item should be transitioned to presentation of a corresponding audio media item by a secondary media player. A secondary media player is a media player that plays an audio media item that corresponds to the video media item. The secondary media player may be, e.g., the audio media player 150, an audio/video player, or some other media player that is able to play/stream an audio media item. Similarly, if the active media player is the secondary media player, and it is placed into a foreground mode, the player controller module 160 determines that presentation of the video media item should be transitioned to presentation of a corresponding video media item by the video media player 140. In some embodiments, the transition occurs such that playback of a media item by the active media player ceases at a particular point, and playback of a corresponding media item begins at the particular point, thus, making the transition between media players playing back the audio components of their respective media items transparent to the user. How the player controller module 160 determines the position of the transition point is discussed below with regard to FIG. 3.

Additionally, in some embodiments, if the time remaining until the presentation of the media item is over (e.g., 1 second left) is less than some threshold time value, the player controller module 160 allows the media player presenting the media item to complete presentation of the media item. Thus, the player controller module 160 may not transition between media players in cases where it otherwise would (e.g., where the active media player is the video media player 140, and the video media player 140 is being placed into a background mode), when, e.g., there is not enough time for a transition to occur.

The player controller module 160 generates instructions for the video media player 140 and the audio media player 150 that cause a transition between which of the media players is active (i.e., presenting a media item to the user). In embodiments where the active media player is the video media player 140, and at some time is placed into a background mode (e.g., the user locks the user device 100), the player controller module 160 generates instructions for the video media player 140 and for the audio media player 150. As discussed in detail below with respect to FIG. 3, the instructions, e.g., load the audio media player 150 (if not already open) and transition playback of the video media item on the video media player 140 to a corresponding audio media item on the audio media player 150. If at some later point the active audio media player 150 is brought to the foreground (e.g., user device 100 is unlocked), the player controller module 160 generates instructions for the video media player 140 and for the audio media player 150 that load the video media player 150 (if it is not already open), and transition playback of the corresponding audio media item on the audio media player 150 to the video media item on the video media player 140. Thus, the player controller module 160 is able to reduce bandwidth consumption in cases where the video media player 140 is placed in a background mode such that only the audio component is being presented to the user.

In contrast, in embodiments where the active media player is the audio media player 150, and at some time it is placed into the background, the player controller module 160 merely continues to present the audio media item. Similarly, if at some later point in time, the active audio media player 150 is brought to the foreground, the audio media player 150 continues to present the audio media item.

In some embodiments, the player controller module 160 generates instructions that cause the video media player 140 to close after playback of the audio media item begins (i.e., the audio media player 150 becomes the active media player) or cause the audio media player 150 to close after playback of the video media item begins (i.e., the video media player 140 becomes the active media player). Minimizing the amount of time multiple players are open and/or streaming data helps conserve resources of the user device 100 and/or the media source 120.

Accordingly, the system disclosed herein is able to dynamically switch between media players in a manner that matches bandwidth requirements with the portions of a media item that are actually being presented to the user. By switching to a media player that retrieves and presents the media item as an audio file when a media player presenting a video media item is in a background mode, the system is able to effectively reduce bandwidth requirements, reduce user device 100 resource requirements, efficiently use resources of the media source 120, or some combination thereof. Moreover, by closing the video media player 140 while in background mode, the user device 100 is able to further reduce the resource requirements of the user device 100 while the media players are in a background mode.

Figure 2:
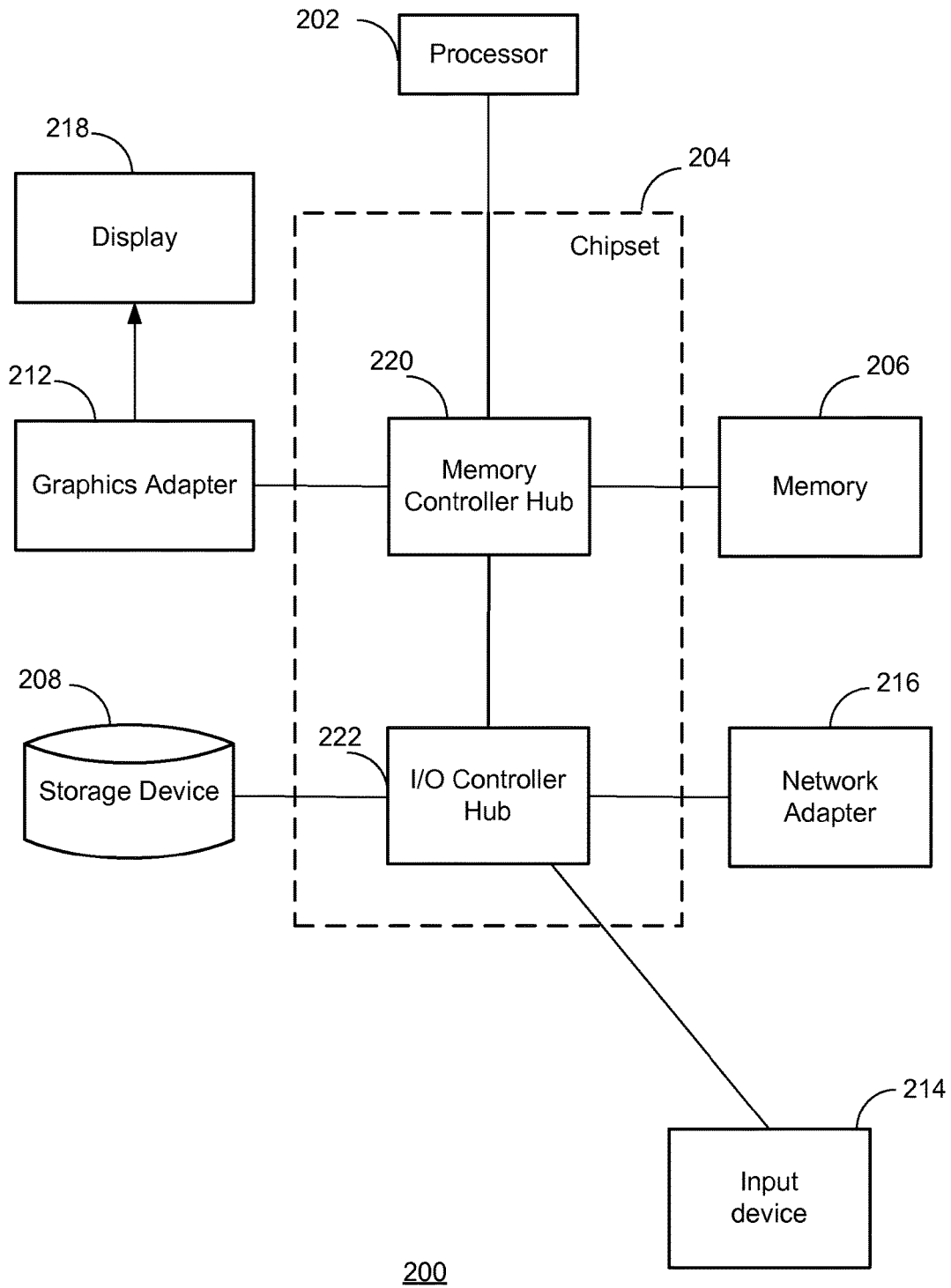
FIG. 2 is a block diagram illustrating an example computer for implementing the entities shown in FIG. 1.

Turning now to a discussion of the implementation of media player switching based on detected changes to a display mode associated with an active media player discussed above, FIG. 2 is a block diagram illustrating an example computer 200 for implementing the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input device 214 is a mouse, track ball, or other type of pointing device, a keyboard, some other device to input data into the computer 200, or some combination thereof. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the user device 100 may interact with one or more servers working together to provide the functionality described herein. Additionally, in some embodiments, some or all of the functionality of the player controller module 160 may be performed by one or more servers in communication with the user device 100. The computers 200 can lack some of the components described above, such as input devices 214, graphics adapters 212, and displays 218.

Figure 3:
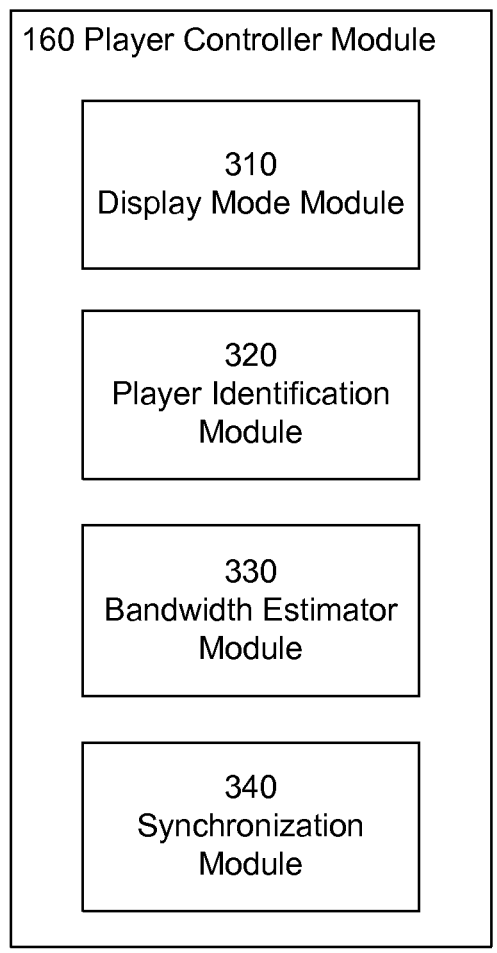
FIG. 3 is a block diagram illustrating a detailed view of modules within the player controller module of a user device according to one embodiment.

FIG. 3 is block diagram illustrating a detailed view of modules within the player controller module 160 of a user device 100 according to one embodiment. Some embodiments of the player controller module 160 have different modules than those described here. Similarly, the functions can be distributed among the modules in a different manner than is described here. The player controller module 160 includes modules such as a display mode module 310, a player identification module 320, a bandwidth estimator module 330, and a synchronization module 340.

The display mode module determines a display mode for the video media player 140 and/or the audio media player 150 using display information received from the user interface 155. A video media player 140 is associated with a background mode if display information indicates the picture component of the media item being presented by the video media player 140 is not displayed to the user. The video media player 140 is associated with a background mode if the display information indicates, e.g., the video media player 140 is minimized, all of the picture component of the video media item is covered up with some other graphic (e.g., another application, a menu, an image, etc.), the user device 100 is 'locked' such that the audio component of the video media item is presented but not the picture component, some other condition occurs where the audio component of the media item is presented but not the picture component of the video item, etc. The video media player 140 is associated with a foreground mode if the display information indicates some, or all of, the picture component of the media item is being presented to the user. In contrast, the audio player 150 is associated with a background mode if the display information indicates the audio player 150 is minimized, covered up with covered up with some other graphic (e.g., another application, a menu, an image, etc.), the user device 100 is 'locked,' etc. The audio media player 150 is associated with a foreground mode if some, or all of, the audio media player 150 is presented to the user. The display mode module 310 notifies one or more other modules within the player controller module 160 if a display mode change occurs for the active media player.

The display mode module 310 identifies changes to display modes associated with the media players using display information received from the user interface 155. The display mode module 310 monitors the display modes associated with active media players. The display mode module 310 stores display modes for each media player. At some point in time, the display mode module 310 receives updated display information. The display mode module 310 determines the display mode for each media player using the updated media information. The display mode module 310 detects changes in the display modes of the media player by comparing the determined display modes with the display modes that were last associated with the media players. For a given media player, if the display modes are the same, no change has occurred, in contrast, if the display modes are different, a change in the display mode has occurred.

The player identification module 320 identifies a second media player based on the detected change in the display mode associated with the active media player. The player identification module 320 determines whether presentation of a media item by an active media player should be transitioned to presentation of a corresponding media item by a different media player based in part on changes in the display mode associated with active media player. If the active media player is the video media player 140 that has been placed into a background mode, the player identification module 320 identifies a secondary media player (e.g., the audio media player 150) for presentation of a corresponding audio media item. Similarly, if the active media player is a secondary media player that has been placed into a foreground mode the player identification module 320 identifies the video media player 140 for presentation of a corresponding video media item.

The bandwidth estimator module 330 estimates the bandwidth of the media item being streamed by the active media player and/or estimate the bandwidth required for the identified media player to stream the corresponding media item. The bandwidth estimator module 330 may, e.g., estimate the bandwidth used to stream a media item by, e.g., measuring a time delay between requesting data from the media source 130 and a time the requested data is received by the user device 100. The bandwidth estimator module 330 provides one or both of the estimated bandwidth to stream the media item and/or the estimated bandwidth to stream the corresponding media item to the synchronization module 340. The bandwidth estimator module 340 may also extract an estimated minimum bandwidth to stream a video media item and an estimated minimum bandwidth required to stream a corresponding media item using streaming metadata associated with the media items. The bandwidth estimator module 340 may provide the estimated minimum bandwidths to the synchronization module 340.

A synchronization point is a location in the stream of a media item where a first media player presenting a media item in a first format ceases presenting the media item, and concurrently, a second media player begins presenting a corresponding media item at a corresponding location. Essentially, it is the point in the stream of the media item where the second media player becomes the active media player. Corresponding locations in media items are locations where the audio component of a video media item is the same as the audio component of the corresponding audio media item. For example, in some instances the audio components for corresponding media items are synchronous in time, meaning a synchronization point that occurs 1 minute into a video media item has a corresponding location at 1 minute in the audio media item.

Generally, streamlining/downloading a video media item uses a much larger bandwidth than streaming/downloading an audio media item. Thus, switching from a video media player 140 that is streaming a video media item to an audio media player 150 streaming a corresponding audio media item generally would result in lower bandwidth requirements. Likewise, switching from an audio media player 150 that is streaming an audio media item to a video media player 140 streaming a corresponding video media item generally results in higher bandwidth requirements.

The synchronization module 340 generates a synchronization point based in part on the one or more estimated bandwidths received from the bandwidth estimator 330. In some embodiments, the synchronization module 340 identifies a synch time value using the one or more estimated bandwidths and lookup table. The lookup table may include information that maps bandwidth values to various synch time values. A synch time value is an estimated amount of time for a corresponding media item to be ready for presentation by an associated media player (e.g., time it takes to buffer enough data to begin presenting a media item or corresponding media item). For example, the lookup table may map a high estimated bandwidth to a short synch time value (e.g., 100 ms), and a low estimated bandwidth to a relatively long synch time value (e.g., 1100 ms). Additionally, in some embodiments, the synch times may account for one or more latency times. A latency time is an estimated time value for a particular process to occur. A latency time may be, e.g., an estimated time value for loading a media player to present the corresponding media item, an estimated time value for setup of a media stack associated with a media item; an estimated time value for a teardown of a media stack associated with a media item; an estimated time value for retrieve streaming metadata; an estimated time value for establishing a new HTTP connection to the media source 120, or some combination thereof. In alternate embodiments, the synchronization module 340 uses fixed synch time values that are based in part on whether the video media player 140 is switching to the audio media player 150 or vice versa. For example, a lower synch time value would be used when a video media player 140 is placed in the background than when an audio media player 150 is placed in the background.

The synchronization module 340 generates a synchronization point using the synch time value. For example, assuming a synch value of 100 ms, the synchronization module 340 generates a synchronization point that triggers 100 ms from the time the synchronization point was generated.

The synchronization module 340 generates switch commands that control the media players. Specifically, switch commands are instructions that facilitate transitioning a media player presenting a media item to a different media player presenting a corresponding media item, and vice versa. A switch command may, e.g., instruct a media player to retrieve the corresponding media item such that playback may begin at the synchronization point, instruct a media player to cease playback at the synchronization point, instruct the active media player to mute the media item being presented at the synchronization point, close a media player, open a media player, provide a time out value that if reached causes a primary media player to close, or some combination thereof. For example, the synchronization module 340 may generate switch commands that cause the active media player to mute (muting playback may be faster than stopping playback) playback of a streaming video media item at the synchronization point, cause the active media player to close, cause a secondary media player to load, cause the video media player 140 to load, cause a secondary media player to begin playback of a corresponding audio media item at a location corresponding to the synchronization point, cause the video media player 140 to begin playback of a corresponding video media item at a location corresponding to the synchronization point, or some combination thereof. The synchronization module 340 provides the generated switch commands to the video media player 140 and the audio media player 150.

Additionally, in some embodiments, the synchronization module 340 does not generate switch commands if some threshold time value is greater than the remaining time of media item. The remaining time is the time remaining until the presentation of the media item is complete. The threshold time value is an estimated time for the transition between media players to occur. In some embodiments, the synchronization module 340 is configured to calculate the threshold time value based on, e.g., the synch time values, the streaming metadata, one or more latency times, or some combination thereof. For example, the threshold value may be some percentage of the synch time value (e.g., 50%). In alternate embodiments, the threshold time value may be set by an administrator. Thus, the player controller module 160 may not cause an active media player to transition to a different active media player in cases where they otherwise would (e.g., where the active media player is the video media player 140, and the video media player 140 is being placed into a background mode), when, e.g., there is not enough time for a transition to occur.

In some embodiments, the synchronization module 340 monitors the synchronization of the secondary media player. Synchronization occurs if the secondary media player is able to buffer a sufficient amount of data to begin playback of a corresponding media item at the synchronization point. In some embodiments, the synchronization module 340 may generate a switch command that instructs a media player to mute the audio component of a corresponding media item, and when synchronization is achieved, generates switch commands that cause the media player to unmute while muting the first media player. In some embodiments, instead of muting/unmuting, the synchronization module 340 may generate switch commands that cross fade the presentation of the media items (i.e., slowly lower the volume of the media item until it mutes while slowly increasing the volume of the corresponding media item to some threshold value).

The synchronization module 340 predicts whether synchronization will occur using, e.g., the amount of buffered data associated with the corresponding media item, the bandwidth associated with streaming the media item, the bandwidth associated with streaming the corresponding media item, or some combination thereof. In some embodiments where synchronization is not predicted to occur, the synchronization module 340 may generate a new synchronization point at some time farther out in the future, and provide it to the media players. Additionally, in some cases, the synchronization module 340 may include a time out value in the switch command to the primary media player. The time out value, if reached, causes the primary media player to stop streaming a media item and close, thus freeing up bandwidth for the secondary media player to stream the corresponding media item. This may be useful when transitioning from an audio media player 150 to a video media player 140 when there is limited available bandwidth for the video media item.

Figure 4:
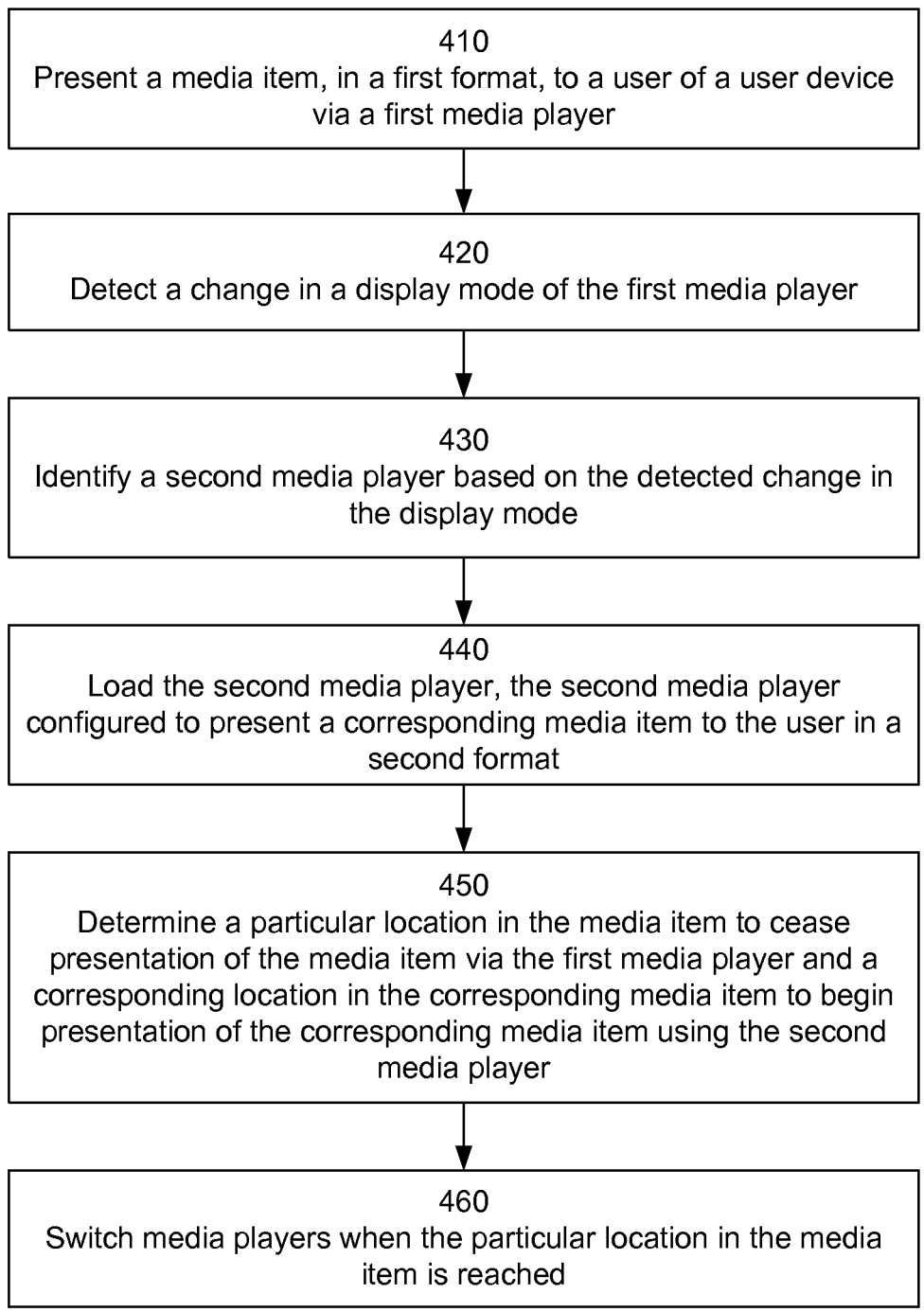
FIG. 4 is a flowchart illustrating a process of switching between media players based on detected changes to a display mode associated with an active media player on a user device according to one embodiment.

FIG. 4 is a flowchart illustrating a process 400 of switching between media players based on detected changes to a display mode associated with an active media player on a user device 100 according to one embodiment. In one embodiment, the process of FIG. 4 is performed by the user device 100. Other entities may perform some or all of the steps of the process in other embodiments. Likewise, embodiments may include different and/or additional steps, or perform the steps in different orders.

The user device 100 presents 410 a media item, in a first format, to a user of the user device 100 via a first media player. For example, the user device 100 may present a video media item to the user via the video media player 140, the video media player 140 being associated with a foreground mode.

The user device 100 detects 420 a change in a display mode of the first media player. The user device 100 may generate display information (e.g., via the user interface 155) describing how the interfaces associated with the media players are being displayed to the user. The user device 100 may identify changes in display modes associated with the media players using the display information. For example, the display information may indicate that a user has locked the user device 100, causing an active video media player 140 to be placed into a background mode.

The user device 100 identifies 430 a second media player based on the detected change in the display mode. For example, if the active media player is the video media player 140 that is being placed into a background mode, the user device 100 identifies a secondary media player as the second media player. Similarly, if the active media player is a secondary media player that is being placed into a foreground mode the user device 100 identifies the video media player 140 as the second media player.

The user device 100 loads 440 the second media player, the second media player configured to present a corresponding media item to the user in a second format. If the second media player is the secondary player (e.g., the audio video player 150), the second media player is configured to present an audio media item that corresponds to the media item. In contrast, if the second media player is the video media player 140, the second media player is configured to present a video media item that corresponds to the media item.

The user device 100 determines 450 a particular location in the media item to cease presentation of the media item via the first media player and a corresponding location in the corresponding media item to begin presentation of the corresponding media item using the second media player. For example, the user device 100 may estimate the bandwidth associated with streaming the first and/or second media item, and determine a synch time value using one or more of the estimated bandwidths. The user device 100 may generate a synchronization point that occurs at the determined synch time. The user device 100 may generate switch commands that include the synchronization point, and provide some or all of the switch commands to the first media player, the second media player, or both.

The user device 100 switches 460 media players when the particular location in the media item is reached. For example, responsive to reaching the particular location in the media item, concurrently, ceasing presentation of the media item via the first media player and beginning presentation of the corresponding media item at the corresponding location using the second media player. For example, the first media player may execute one or more of the generated switch commands that cause it to cease presentation of the media item at a time determined by the synchronization point. In some embodiments, the switch commands may also cause the first media player to close after it ceases presentation of the media item. Additionally, the second media player may execute one or more of the generated switch commands that cause it to begin presentation of the corresponding media item at the time determined by the synchronization point.

In alternate embodiments, one or more of steps of process 400 may be performed by a server in communication with the user device 100. For example, steps 420-450 may be performed on a server, such that the server generates the switch commands and provides them to the user device 100.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for switching between media players on a user device 100. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for switching between media players on a user device, comprising:
   detecting a change in a display mode associated with a first media player presenting a media item to a user of the user device, the first media player configured to receive the media item in a first data stream, the media item being associated with a first format and including a first audio component;
   identifying a second media player that is configured to receive a corresponding media item in a second data stream, the corresponding media item being associated with a second format and including a second audio component that matches the first audio component;
   determining a particular location in the media item to cease presentation of the media item via the first media player and a corresponding location in the corresponding media item to begin presentation of the corresponding media item using the second media player; and
   responsive to reaching the particular location in the media item, concurrently, ceasing presentation of the media item via the first media player and beginning presentation of the corresponding media item at the corresponding location using the second media player.

2. The method of claim 1, wherein ceasing presentation of the media item via the first media player further comprises:
   muting the presentation of the first media item; and
   closing the first media player.

3. The method of claim 1, wherein determining the particular location in the media item to cease presentation of the media item via the first media player and the corresponding location in the corresponding media item to begin presentation of the corresponding media item using the second media player, comprises:
estimating a bandwidth associated with the corresponding media item;
determining a synch time using the estimated bandwidth; and
determining the particular location in the media item and the corresponding location in the corresponding media item using the synch time.

4. The method of claim 1, further comprising:
monitoring an amount of buffered data associated with the corresponding media item;
determining that the amount of buffered data is not sufficient to begin presentation of the corresponding media item after the first media player reaches the particular location in the media item; and
closing the first media player.

5. The method of claim 1, wherein the first media player is a video media player, the media item is a video media item that also includes a picture component, the second video player is an audio media player, and the corresponding media item is an audio media item, and wherein the change to the display mode caused none of the picture component of the media item to be displayed by the user device.

6. The method of claim 5, further comprising:
presenting the corresponding media item to the user via the second media player; and
responsive to a change in a display mode associated with the second media player,
determining a second particular location in the corresponding media item to cease presentation of the corresponding media item via the second media player and a second corresponding location in the media item to begin presentation of the media item using the first media player; and
responsive to reaching the second particular location in the corresponding media item, concurrently, ceasing presentation of the corresponding media item via the second media player and beginning presentation of the media item at the second corresponding location using the first media player.

7. The method of claim 6, wherein ceasing presentation of the corresponding media item via the second media player further comprises:
muting the presentation of the second media item; and
closing the second media player.

8. A non-transitory computer-readable storage medium storing executable computer program instructions for switching between media players on a user device, the instructions executable to perform steps comprising:
detecting a change in a display mode associated with a first media player presenting a media item to a user of the user device, the first media player configured to receive the media item in a first data stream, the media item being associated with a first format and including a first audio component;
identifying a second media player that is configured to receive a corresponding media item in a second data stream, the corresponding media item being associated with a second format and including a second audio component that matches the first audio component;
determining a particular location in the media item to cease presentation of the media item via the first media player and a corresponding location in the corresponding media item to begin presentation of the corresponding media item using the second media player; and
responsive to reaching the particular location in the media item, concurrently, ceasing presentation of the media item via the first media player and beginning presentation of the corresponding media item at the corresponding location using the second media player.

9. The computer-readable medium of claim 8, wherein ceasing presentation of the media item via the first media player further comprises:
muting the presentation of the first media item; and
closing the first media player.

10. The computer-readable medium of claim 8, wherein determining the particular location in the media item to cease presentation of the media item via the first media player and the corresponding location in the corresponding media item to begin presentation of the corresponding media item using the second media player, comprises:
estimating a bandwidth associated with the corresponding media item;
determining a synch time using the estimated bandwidth; and
determining the particular location in the media item and the corresponding location in the corresponding media item using the synch time.

11. The computer-readable medium of claim 8, further comprising:
monitoring an amount of buffered data associated with the corresponding media item;
determining that the amount of buffered data is not sufficient to begin presentation of the corresponding media item after the first media player reaches the particular location in the media item; and
closing the first media player.

12. The computer-readable medium of claim 8, wherein the first media player is a video media player, the media item is a video media item that also includes a picture component, the second video player is an audio media player, and the corresponding media item is an audio media item, and wherein the change to the display mode caused none of the picture component of the media item to be displayed by the user device.

13. The computer-readable medium of claim 12, further comprising:
presenting the corresponding media item to the user via the second media player; and
responsive to a change in a display mode associated with the second media player,
determining a second particular location in the corresponding media item to cease presentation of the corresponding media item via the second media player and a second corresponding location in the media item to begin presentation of the media item using the first media player; and
responsive to reaching the second particular location in the corresponding media item, concurrently, ceasing presentation of the corresponding media item via the second media player and beginning presentation of the media item at the second corresponding location using the first media player.

14. The computer-readable medium of claim 13, wherein ceasing presentation of the corresponding media item via the second media player further comprises:
muting the presentation of the second media item; and
closing the second media player.

15. A device for switching between media players on a user device, comprising:
a processor configured to execute modules; and
a memory storing the modules, the modules comprising:

a display mode module configured to detect a change in a display mode associated with a first media player presenting a media item to a user of the user device, the first media player configured to receive the media item in a first data stream, the media item being associated with a first format and including a first audio component, a player identification module configured to identify a second media player that is configured to receive a corresponding media item in a second data stream, the corresponding media item being associated with a second format and including a second audio component that matches the first audio component, a synchronization module configured to determine a particular location in the media item to cease presentation of the media item via the first media player and a corresponding location in the corresponding media item to begin presentation of the corresponding media item using the second media player, and wherein the user interface module is further configured to, responsive to reaching the particular location in the media item, concurrently, cease presentation of the media item via the first media player and begin presentation of the corresponding media item at the corresponding location using the second media player.

16. The device of claim 15, wherein the user interface module is further configured to:
mute the presentation of the first media item; and
close the first media player.

17. The device of claim 15, further comprising:
a bandwidth estimator module configured to estimate a bandwidth associated with the corresponding media item; and
wherein the synchronization module is further configured to:
determine a synch time using the estimated bandwidth; and
determine the particular location in the media item and the corresponding location in the corresponding media item using the synch time.

18. The device of claim 15, wherein the synchronization module is further configured to:
monitor an amount of buffered data associated with the corresponding media item;
determine that the amount of buffered data is not sufficient to begin presentation of the corresponding media item after the first media player reaches the particular location in the media item; and
the user interface module is further configured to close the first media player.

19. The device of claim 15, wherein the first media player is a video media player, the media item is a video media item that also includes a picture component, the second video player is an audio media player, and the corresponding media item is an audio media item, and wherein the change to the display mode caused none of the picture component of the media item to be displayed by the user device.

20. The device of claim 19, wherein,
the user interface module is further configured to present the corresponding media item to the user via the second media player;
the display mode module is further configured to detect a change in a display mode associated with the second media player;
the synchronization module is further configured to determine a second particular location in the corresponding media item to cease presentation of the corresponding media item via the second media player and a second corresponding location in the media item to begin presentation of the media item using the first media player; and
the user interface module is further configured to, responsive to reaching the second particular location in the corresponding media item, concurrently, cease presentation of the corresponding media item via the second media player and begin presentation of the media item at the second corresponding location using the first media player.

* * * * *